United States Patent
White et al.

(10) Patent No.: US 7,244,323 B2
(45) Date of Patent: Jul. 17, 2007

(54) METHOD AND MATERIALS TO INHIBIT OBJECT CONSOLIDATION IN LOCALIZED AREAS

(75) Inventors: Dawn White, Ann Arbor, MI (US); David Carmein, Ann Arbor, MI (US); Shyam Keshavmurthy, Ann Arbor, MI (US)

(73) Assignee: Solidica, Inc., Ann Arbor, MI (US)

( * ) Notice: Subject to any disclaimer, the term of this patent is extended or adjusted under 35 U.S.C. 154(b) by 395 days.

(21) Appl. No.: 10/646,599

(22) Filed: Aug. 21, 2003

(65) Prior Publication Data

US 2004/0071862 A1   Apr. 15, 2004

Related U.S. Application Data

(60) Provisional application No. 60/404,974, filed on Aug. 21, 2002.

(51) Int. Cl.
*B32B 37/00* (2006.01)
(52) U.S. Cl. ............... 156/64; 156/73.1; 700/98
(58) Field of Classification Search ............ 156/64, 156/73.1, 580.1, 580.2; 700/95, 98, 118, 700/119, 120
See application file for complete search history.

(56) References Cited

U.S. PATENT DOCUMENTS

| 6,450,393 | B1 | 9/2002 | Doumanidis et al. ..... 228/110.1 |
| 6,589,471 | B1 * | 7/2003 | Khoshnevis ................ 264/497 |

* cited by examiner

*Primary Examiner*—James Sells
(74) *Attorney, Agent, or Firm*—Gifford, Krass, Sprinkle, Anderson & Citkowski, PC

(57) ABSTRACT

Materials and methods inhibit the localized build-up of material with respect to certain additive manufacturing processes, including those based on ultrasonic consolidation. Where an object is fabricated by consolidating material increments from a feedstock in accordance with a description of the object, the invention prevents the consolidation in specified regions to provide for an intrinsic support or to otherwise build a part or component in accordance with the description. The object being fabricated, the feedstock, or both, may be treated so as to inhibit the consolidation of material increments in the localized area. That is, such treatment may affect the surface chemistry of the feedstock to prevent local bonding, or the treatment may be applied to a previously built surface of the object. The treatment may include the introduction of an oxidizer, such as a metal nitrate, chlorate, chromate, peroxide, or manganate; a base or alkali; or a coating of a lubricious material such as tin, Teflon, or petroleum distillates to prevent the breakup of an oxide layer.

18 Claims, No Drawings

METHOD AND MATERIALS TO INHIBIT OBJECT CONSOLIDATION IN LOCALIZED AREAS

REFERENCE TO RELATED APPLICATION

This application claims priority from U.S. Provisional Patent Application Ser. No. 60/404,974, filed Aug. 21, 2002, the entire content of which is incorporating herein by reference.

FIELD OF THE INVENTION

This invention relates generally to additive manufacturing and, in particular, to techniques for inhibiting the build-up of material in localized areas.

BACKGROUND OF THE INVENTION

Commonly assigned U.S. patent application Ser. No. 09/532,432 now U.S. Pat. No. 6,519,500 and Ser. No. 10/088,040 now U.S. Pat. No. 6,814,823, the entire content of each being incorporated herein by reference, disclose systems and methods for fabricating objects by consolidating material increments in accordance with a description of the object using a process that produces an atomically clean faying surface between the increments without melting the material in bulk. Ultrasonic, electrical resistance, and frictional methodologies, and combinations thereof, may be used for such consolidation.

According to these previous disclosures, the material increments are placed in position to shape the object by a material feeding unit. The raw material may be provided in various forms, including flat sheets, segments of tape, strands of filament or single dots cut from a wire roll. The material may be metallic or plastic, and its composition may vary discontinuously or gradually from one layer to the next, creating a region of functionally gradient material. Plastic or metal matrix composite material feedstocks incorporating reinforcement materials of various compositions and geometries may also be used.

If excess material is applied due to the feedstock geometry employed, such material may be removed after each layer is bonded, or at the end of the process; that is, after sufficient material has been consolidated to realize the final object. A variety of tools may be used for material removal, depending on composition and the target application, including knives, drilling or milling machines, laser cutting beams, grinding, EDM, chemical etch, or ultrasonic cutting tools.

The material increments are fed sequentially and additively according to a computer-model description of the object, which is generated by a computer-aided design (CAD) system, preferably on a layer-by-layer basis. The CAD system, which holds the description of the object, interfaces with a numerical controller, which in turn controls one or more actuators. The actuators impart motion in multiple directions. Three orthogonal directions may be used or five axes, including pitch and yaw as well as XYZ, may be appropriate for certain applications, so that each increment (i.e., layer) of material is accurately placed in position and clamped under pressure.

During these additive manufacturing or free-form fabrication processes, it is often important to provide a support material to the part being produced. This is most often the case when enclosed volumes, or cantilevered sections are being produced, although other types of features with less aggressive unsupported geometries also require the use of supports. There are two types of support structures in free form fabrication, which can be classified as intrinsic and extrinsic.

Intrinsic support structures are those which are essentially produced as a result of the process itself. A classic example of this situation is that pertaining in selective laser sintering or 3D printing, wherein a powder layer is spread across an entire build volume. An operation is performed on certain regions of the powder (i.e., passing a laser over it to melt the powders, or printing binder over it to cause the particles to adhere to each other), which correspond to the cross section of the layer of the part being built to cause the particles to adhere. The remainder of the unaffected powder remains in place as another layer is spread and the process repeated. This mass of unbound powder serves the function of supporting additional layers of material as they are deposited.

Extrinsic support are those in which a second material is used to support the growing structure (examples include shape deposition modeling and inkjet based systems), or in which special support structures are built using the build material or a second material (examples include fused deposition modeling and stereolithography) which are later cut off. In general, intrinsic supports have advantages over the extrinsic types, as they are simpler to implement, since they do not require the supply of a second material.

SUMMARY OF THE INVENTION

This invention resides in materials and methods to inhibit the localized build-up of material with respect to certain additive manufacturing processes, including those based on ultrasonic consolidation. Using such processes, an object is fabricated by consolidating material increments from a feedstock in accordance with a description of the object. This invention prevents the consolidation in specified regions to provide for an intrinsic support or to otherwise build a part or component in accordance with the description.

In the preferred embodiments, the object being fabricated, the feedstock, or both, are treated so as to inhibit the consolidation of material increments in the localized area. Such treatment may affect the surface chemistry of the feedstock to prevent local bonding, or the treatment may be applied to a previously built surface of the object.

In different situations, the treatment may include the introduction of an oxidizer, such as a metal nitrate, chlorate, chromate, peroxide, or manganate; a base or alkali; or a coating of a lubricious material such as tin, Teflon, or petroleum distillates to prevent the breakup of an oxide layer. In any case, the coating may have a thickness in the range of angstroms to microns to prevent accumulation of Z-axis errors.

DETAILED DESCRIPTION OF THE INVENTION

This invention broadly concerns specific types of intrinsic supports. Of particular interest are support methods which involve the local inhibition of ultrasonic bonding in the presence of an excited roller. In preferred embodiments, the inhibitor affects only the interface actually being acted on, not ensuing layers applied above it. Since ultrasonic bonding causes enhanced plastic flow, many alternative solutions, such as employing powders to prevent joining, are insufficient. In addition, inhibitants which affect the height of the interlaminar zone are undesirable, as they can affect Z-axis build registration and part accuracy.

During ultrasonic consolidation of metals, the ultrasonic energy provided by the sonotrode has the effect of breaking up the surface oxide layer present on the feedstock, exposing atomically clean metal surfaces to each other. Due to the physical nature of the metallic atomic bond, the process is capable of forming a joint under modest pressure and at low temperature in the solid state. The oxide layer at the surface of the metal is only a few microns thick, and is generally readily disrupted by the action of the ultrasonic energy at the faying surfaces. However, under certain conditions, these surface oxides can become highly resistant to fracture and dispersion during ultrasonic consolidation.

For example, 5XXX series aluminum alloys, containing high levels of Mg, form a hydrated magnesium oxide during rolling and are difficult to use in ultrasonic consolidation. This is because the hydrated Mg oxide is very tenacious and difficult to disrupt and disperse in the plastic flow zone which forms at the faying surfaces during ultrasonic consolidation. Anodized surfaces are similarly resistant. However, these surface oxides are either the same thickness, or only a few microns thicker than the easily dispersed surfaces occurring on readily weldable alloys such as 3003 and 3005.

According to the invention, it is possible to chemically alter the local surface conditions by applying reagents to the surface. Such materials may include, but are not limited to, oxidizers such as metal nitrates, chlorates, chromates, peroxides, and manganates. Strong bases and alkalis may also be used. It is also possible to apply very thin (1-2 micron) coatings of tin, Teflon, or petroleum distillates, or another highly lubricious material to the surface of the previously deposited material, preventing the breakup of oxide layers. Various processes can be used, including but not limited to PVD, printing, electroless plating and others.

Other processes such anodizing, plating (electroless and decorative nickel, decorative copper and chrome, hard chromium), electropolishing, black oxide and phosphate coating, chromate conversion and passivation can be used to modify surface oxide behavior to produce local inhibition of the ultrasonic consolidation. The methods and materials mentioned here are meant to be exemplary, and many other materials and processes may be suited to the modification of surface behavior during ultrasonic consolidation to inhibit bonding, while having little or no effect on the thickness of the surface oxide layers.

The application of these processes or materials to the surface may occur in a number of ways. Examples include ink jet or bubble jet printing of a solution on the surface of the part, application of a paste which is applied and removed, the use of a electrode or spark process to apply or modify the coating, etc. These examples are not meant to exclude any other means of achieving a surface condition modification which may result in a very thin layer of inhibitant on the feedstock surface.

In additive manufacturing, applying support materials to a previously deposited or built surface is simple. In addition, for ultrasonic consolidation, it is possible to apply the inhibitor to the feedstock itself. In this case, the side of the tape, sheet, wire, or other feedstock geometry of interest which is to be applied to the part surface would be exposed to the inhibitant application process. By calculating the correct surface area, and locations on the feedstock, the inhibitor may be applied only in the zones in which consolidation is not desired. The advantage of this is a) that the inhibitant application occurs during bonding of a previously applied layer, and does not require an additional process step, and b) the time involved. Other strategies for inhibition application may be appropriate, and these two examples are not meant to exclude their use, but to function only as examples.

It may also be desirable to treat the entire surface of a feedstock with an inhibitor which makes it difficult to produce strong ultrasonic consolidation. The processes described above could be replaced with techniques such as chemical etching, electrochemical etching, plasma cleaning, mechanical cleaning, stripping, exposure to reducing agents or atmospheres, etc. to remove the inhibited surface only in regions in which ultrasonic consolidation is desired to take place. The methods for removing such inhibitors described above serve as examples only, numerous other methods could be applied, and the invention is not limited to those listed.

While it is theoretically possible to carry out the treatments described herein on a manual or emergency basis, in the preferred embodiments the modifications and/or materials are applied on an automated basis by analyzing the description of the object to be, or being, fabricated. If, through such analysis, it is determined that an intrinsic type of support may be necessary or even desirable, further analysis may be carried out to determine which of the available methods would be most appropriate in view of the part being made, the materials involved, or other factors. The appropriate inhibitive treatment would then be applied on an ongoing basis, integrated with the process flow.

We claim:

1. In an additive manufacturing process of the type wherein an object is fabricated by consolidating material increments from a feedstock in accordance with a description of the object, a method of preventing the build-up of material in a localized area comprising the step of:
   providing a feedstock in the form of sheet, tape, or wire material increments;
   bonding the material increments to an object being fabricated; and
   treating the object being fabricated, the feedstock, or both, so as to inhibit the consolidation of material increments in one or more localized areas.

2. The method of claim 1, wherein the treatment affects the surface chemistry of the feedstoek to prevent local bonding.

3. The method of claim 1, wherein the treatment is applied to a previously built surface of the object.

4. The method of claim 1, wherein the treatment includes the introduction of an oxidizer.

5. The method of claim 1, wherein the oxidizer is a metal nitrate, chlorate, chromate, peroxide, or manganate.

6. The method of claim 1, wherein the treatment includes the introduction of a base or alkali.

7. The method of claim 1, wherein the treatment includes a thin coating of a lubricious material such as tin to prevent the breakup of an oxide layer.

8. The method of claim 1, wherein the treatment forms a coating having a thickness in the range of angstroms to microns to prevent accumulation of Z-axis errors.

9. The method of claim 1, wherein the consolidation is in the form of ultrasonic consolidation.

10. In an additive manufacturing process of the type wherein an object is fabricated by consolidating material increments from a feedstock in accordance with a description of the object, a method of preventing the build-up of material in a particular area comprising the steps of:
    analyzing the description of the object to determine if an intrinsic support would be necessary or desirable to the fabrication thereof;

determining whether localized, inhibited consolidation would be appropriate to the formation of the intrinsic support and, if so:

treating the object being fabricated, the feedstock, or both, so as to inhibit the consolidation of material increments in accordance with the description of the object.

11. The method of claim 10, wherein the treatment affects the surface chemistry of the feedstock to prevent local bonding.

12. The method of claim 10, wherein the treatment is applied to a previously built surface of the object.

13. The method of claim 10, wherein the treatment includes the introduction of an oxidizer.

14. The method of claim 10, wherein the oxidizer is a metal nitrate, chlorate, chromate, peroxide, or manganate.

15. The method of claim 10, wherein the treatment includes the introduction of a base or alkali.

16. The method of claim 10, wherein the treatment includes a thin coating of a lubricious material such as tin to prevent the breakup of an oxide layer.

17. The method of claim 10, wherein the treatment forms a coating having a thickness in the range of angstroms to microns to prevent accumulation of Z-axis errors.

18. The method of claim 10, wherein the consolidation is in the form of ultrasonic consolidation.

* * * * *